(12) United States Patent
Nalbandian et al.

(10) Patent No.: US 8,090,640 B2
(45) Date of Patent: Jan. 3, 2012

(54) ORDER DELIVERY IN A SECURITIES MARKET

(75) Inventors: Carolyn A. Nalbandian, Fairfield, CT (US); Daniel F. Moore, New Haven, CT (US); Fred Stiening, Derby, CT (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 2198 days.

(21) Appl. No.: 10/206,894

(22) Filed: Jul. 25, 2002
(Under 37 CFR 1.47)

(65) Prior Publication Data
US 2003/0229569 A1   Dec. 11, 2003

Related U.S. Application Data

(60) Provisional application No. 60/385,988, filed on Jun. 5, 2002.

(51) Int. Cl.
*G06Q 40/00* (2006.01)
(52) U.S. Cl. ............................................. 705/37; 705/35
(58) Field of Classification Search .................... 705/37, 705/26, 35
See application file for complete search history.

(56) References Cited

U.S. PATENT DOCUMENTS

| | | | |
|---|---|---|---|
| 4,412,287 A * | 10/1983 | Braddock, III | 705/37 |
| 4,942,616 A * | 7/1990 | Linstroth et al. | 705/36 R |
| 5,077,665 A | 12/1991 | Silverman et al. | |
| 5,101,353 A | 3/1992 | Lupien et al. | |
| 5,297,031 A | 3/1994 | Gutterman et al. | |
| 5,721,777 A * | 2/1998 | Blaze | 380/286 |
| 5,774,879 A | 6/1998 | Custy et al. | |
| 5,812,988 A | 9/1998 | Sandretto | |
| 5,827,071 A | 10/1998 | Sorensen et al. | |
| 5,924,082 A | 7/1999 | Silverman et al. | |
| 6,014,643 A | 1/2000 | Minton | |
| 6,035,287 A | 3/2000 | Stallaert et al. | |
| 6,157,914 A | 12/2000 | Seto et al. | |
| 6,317,726 B1 | 11/2001 | O'Shaughnessy | |
| 6,317,728 B1 | 11/2001 | Kane | |
| 6,389,402 B1 * | 5/2002 | Ginter et al. | 705/51 |
| 6,442,533 B1 | 8/2002 | Hinkle | |
| 6,505,174 B1 | 1/2003 | Keiser et al. | |
| 6,601,044 B1 | 7/2003 | Wallman | |
| 7,110,975 B2 | 9/2006 | Marks de Chabris et al. | |
| 7,167,844 B1 | 1/2007 | Leong et al. | |
| 7,181,424 B1 | 2/2007 | Ketchum et al. | |
| 7,246,092 B1 | 7/2007 | Peterson et al. | |
| 7,580,875 B1 * | 8/2009 | Finn et al. | 705/36 R |
| 2001/0034686 A1 | 10/2001 | Eder | |

(Continued)

OTHER PUBLICATIONS

Caroline E. Mayer, "Companies Use Toll-Free Numbers to Prioritize 'Important' Customers; [Final Edition]", Seattle Times, Seattle Washington, Jul. 28, 1998, p. E3.*

(Continued)

*Primary Examiner* — Charles Kyle
*Assistant Examiner* — Edward Baird
(74) *Attorney, Agent, or Firm* — Nixon & Vanderhye P.C.

(57) ABSTRACT

A method of processing delivery messages in a security processing architecture includes receiving an expression of interest to enter into a transaction to buy or sell a security, matching the expression of interest with other expressions of interest, sending a message to a market participant that a match exists, recording a delivery in a delivery log file, recording the delivery in a delivery work in process (WIP) file, and receiving a response message from the market participant.

33 Claims, 7 Drawing Sheets

U.S. PATENT DOCUMENTS

| | | | |
|---|---|---|---|
| 2002/0052827 A1* | 5/2002 | Waelbroeck et al. | 705/37 |
| 2002/0138401 A1 | 9/2002 | Allen et al. | |
| 2002/0156716 A1 | 10/2002 | Adatia | |
| 2002/0156722 A1* | 10/2002 | Greenwood | 705/37 |
| 2003/0004859 A1* | 1/2003 | Shaw et al. | 705/37 |
| 2003/0050879 A1* | 3/2003 | Rosen et al. | 705/35 |
| 2003/0083973 A1 | 5/2003 | Horsfall | |
| 2003/0093343 A1* | 5/2003 | Huttenlocher et al. | 705/35 |
| 2003/0225671 A1 | 12/2003 | Miller et al. | |
| 2003/0225672 A1 | 12/2003 | Hughes, Jr. et al. | |
| 2003/0225673 A1 | 12/2003 | Hughes, Jr. et al. | |
| 2003/0225674 A1 | 12/2003 | Hughes, Jr. et al. | |
| 2003/0229566 A1 | 12/2003 | Moore et al. | |
| 2003/0229567 A1 | 12/2003 | Serkin et al. | |
| 2003/0229568 A1 | 12/2003 | Richmann et al. | |
| 2004/0143542 A1 | 7/2004 | Magill et al. | |

OTHER PUBLICATIONS

Downes: "Dictionary of Financial and Investment Terms", Barons Financial Guide, Copyright 1998, pp. 328 and 350.*

RAM: A Brief Introduction from http://www.linfo.org/ram.html. Created Jul. 9, 2004. Updated Jun. 10, 2006. The Linux Information Project. [3 Pages].

John Wiley & Sons Ltd, Dictionary of Multimedia and Internet Applications: A Guide for Developers and Users, 1999, retrieved by xreferplus.com. [3 Pages].

* cited by examiner

ORDER DELIVERY IN A SECURITIES MARKET

RELATED APPLICATIONS

This application claims the priority of U.S. Provisional Patent Application No. 60/385,988, entitled "Security Processor", and filed on Jun. 5, 2002.

BACKGROUND

This invention relates to securities transactions.

Electronic equity markets collect, aggregate, and display pre-trade information to market participants. For example, in some markets, the pre-trade information takes the form of a quote that represents a single or an aggregate of same-priced principal or agency orders. Some markets also provide trading platforms through which market participants may trade securities in a marketplace.

SUMMARY

In one aspect, the invention is a method of processing delivery messages in a security processing architecture. The method includes receiving an expression of interest to enter into a transaction to buy or sell a security, matching the expression of interest with other expressions of interest, sending a message to a market participant that a match exists, recording a delivery in a delivery log file, recording the delivery in a delivery work in process (WIP) file, and receiving a response message from the market participant.

In another aspect, the invention is an article. The article includes a machine-readable medium that stores executable instructions for validation within a securities processing system. The instructions cause a machine to receive an expression of interest to enter into a transaction to buy or sell a security, match the expression of interest with other expressions of interest, send a message to a market participant that a match exists, record a delivery in a delivery log file, record the delivery in a delivery work in process (WIP) file, and receive a response message from the market participant.

In still another aspect, the invention is a securities processing system. The system includes a memory that stores executable instructions for validations. The system executes the instructions to receive an expression of interest to enter into a transaction to buy or sell a security, match the expression of interest with other expressions of interest, send a message to a market participant that a match exists, record a delivery in a delivery log file, record the delivery in a delivery work in process (WIP) file, and receive a response message from the market participant.

Some or all of the aspects of the invention described above may have some or all of the following advantages. The securities processing system processes delivers orders efficiently by using files (e.g., trigger file, delivery log file) to track the transactions. The security processing system handles all aspects of a delivered execution including performing validations, timing the delivery, sending and receiving messages, and reporting to trading services. In addition, the architecture of the securities processing system includes multiple securities processors in parallel. Each securities processor handles a fraction of the total securities in a market and each securities processor validates orders and quotes for the securities it processes. Thus, the distributed functionality of the order deliveries across multiple processors further improves the efficiency of securities processing.

DESCRIPTION

Figure 1:
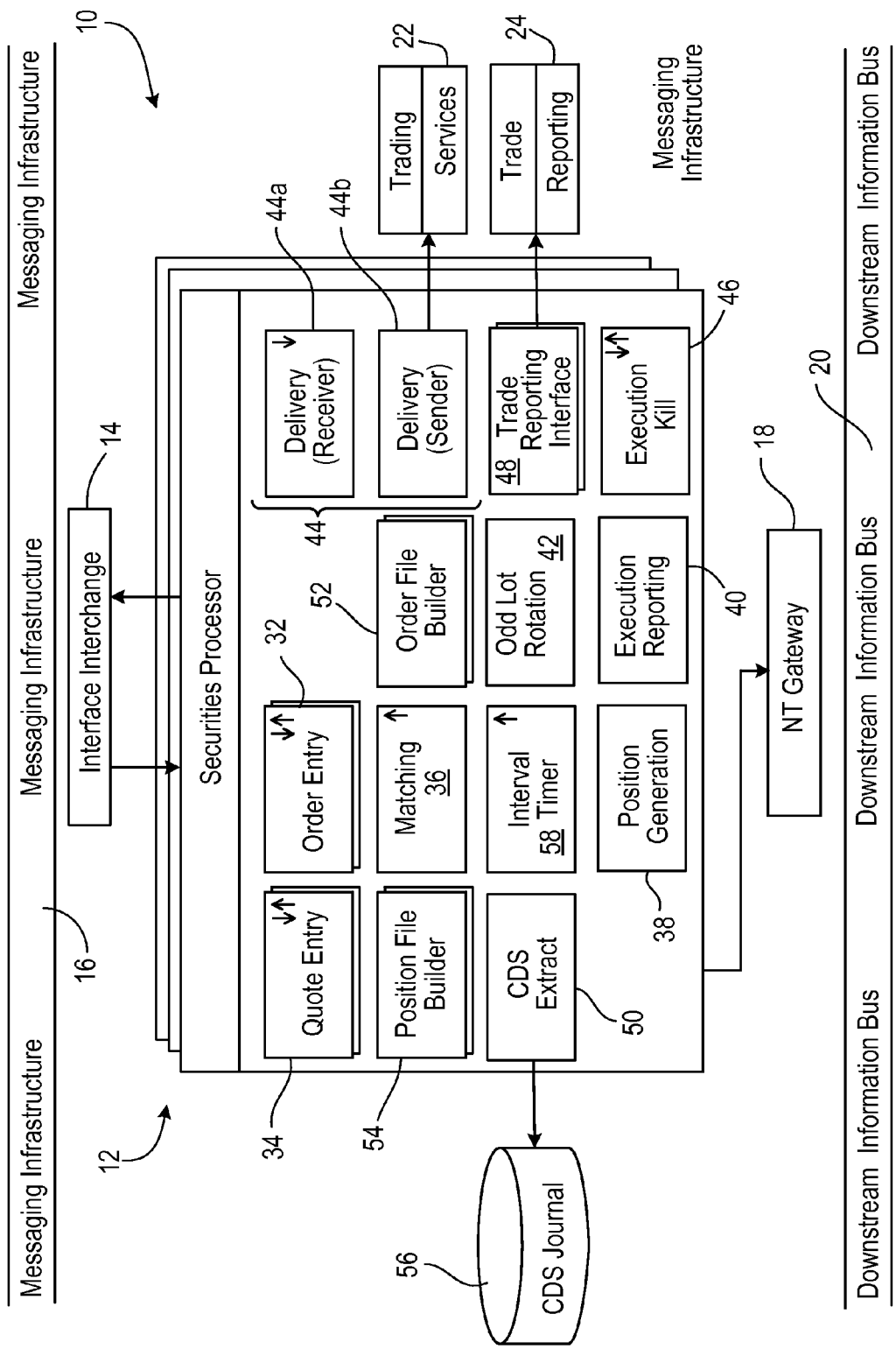
FIG. 1 is a functional diagram of a securities processing architecture.
Figure 2:
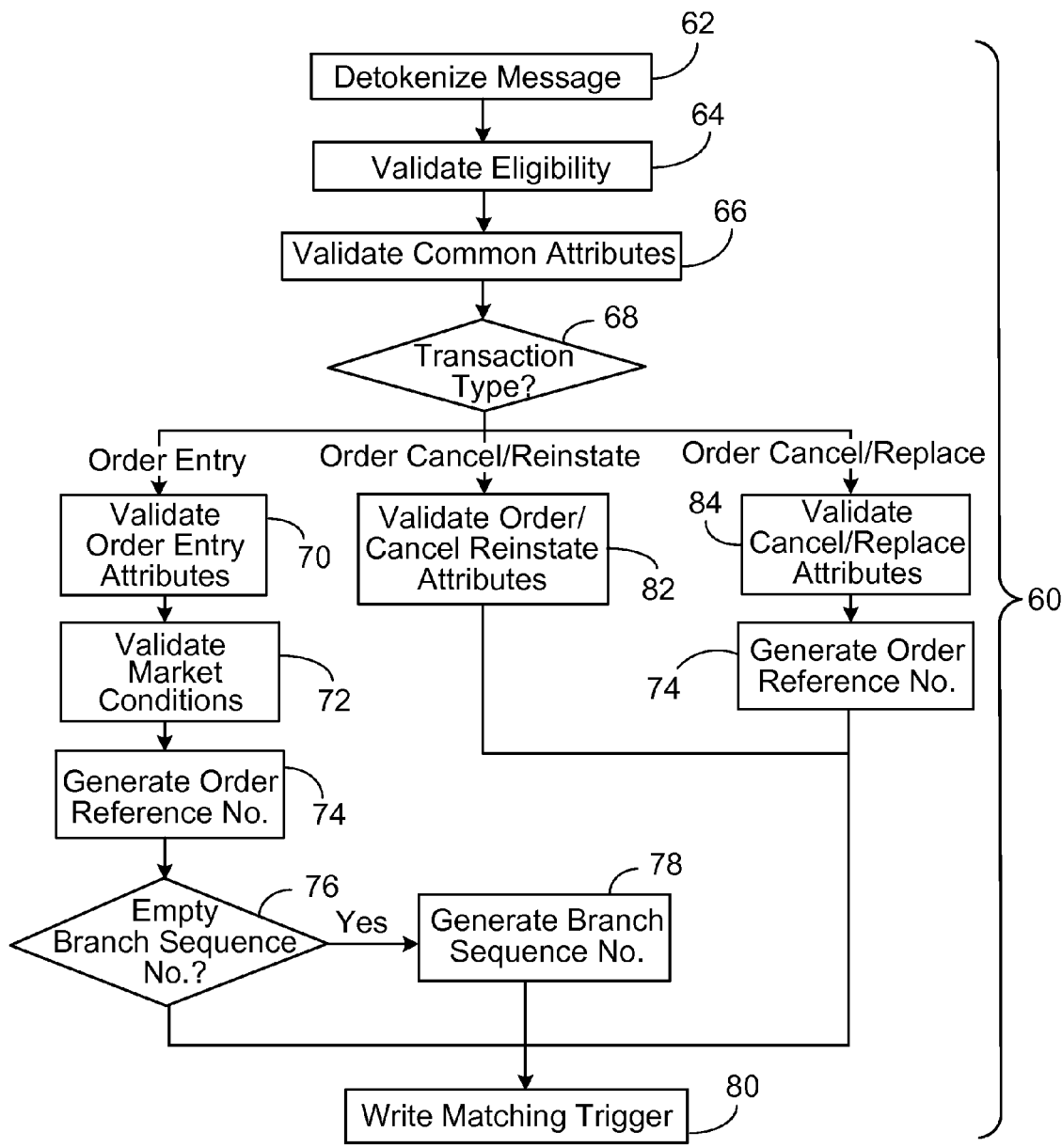
FIG. 2 is a flowchart of a process for order entry.

Referring to FIG. 1, a securities processing architecture 10 handles the processing of securities transactions including executing orders or processing quote transactions in a market trading environment. Securities processing architecture 10 includes a set of securities processors 12, a messaging infrastructure interface 14 to a messaging infrastructure 16, and a gateway 18 to a downstream information bus 20. Each securities processor 12 interfaces with trading services network 22, trade reporting 24, and a common data stream (CDS) journal 26. Trading services network 24 with market participants. Trading services 24 used in this embodiment is SELECTNET®.

Securities are distributed over securities processors 12 so that each processor handles a fraction of the total securities that are traded in the market. For example, one securities processor 12 may handle one or two high-volume transaction securities while another securities processor 12 may handle many low-volume transaction securities. Securities processing architecture 10 is a multi-parallel architecture and thus horizontally scalable for incremental growth.

Securities processors 12 receive messages from market participants through messaging infrastructure interface 14. The messages include order transactions and quote transactions. The messages are allocated to the securities processor that handles the security.

Each security processor 12 includes program components that process the messages received. These components include an order entry component 32, a quote entry component 34, a matching component 36, a position generator 38, an execution reporting component 40, a delivery component including a delivery (sender) subcomponent 44a and a delivery (receiver) subcomponent 44b, and an execution kill component 46. Optionally the security processor 12 can include an odd lot rotation component 42.

Order entry component 32 receives all transactions related to the entry and maintenance of orders. Order entry component 32 handles field level validations, eligibility verifications, assignment of branch sequence numbers, logging of the transaction and passing the transaction to matching component 36. Orders that fail any of the checks performed by order entry component 32 are rejected.

Quote entry component 34 receives all transactions related to the entry and maintenance of quotes. Quote entry component 34 handles field level validations, eligibility verifications, transformation into one or two orders, logging of the transaction and passing the transaction to matching component 36. Quotes that fail any of the checks performed by quote entry component 34 are rejected.

The matching component 36 in the securities processor 12 matches incoming interest against orders and quotes in an automatic execution facility. Matching component 36 is responsible for market situation dependent checks and matching. Matching component 36 receives orders from quote entry component 34 and order entry component 32 and performs checks and validations that require definite and unambiguous knowledge of the current market situation (e.g., marketability check, sanity check, short sale rule, etc.). If the order is valid and executable, the matching process performs the execution according to a specified process; if the order is not valid and executable, the order is added to an order table. Orders that fail a check are rejected. An opening subcomponent (not shown) within matching component 36 provides the special logic and handling required during the pre-open market period and when the market for this security is opened.

The subsequent post-execution components of securities processor 12 are responsible for processing the executions, i.e., the outcome of matching component 36. Position generation component 38 generates the quote display of a traditional montage and receives updates to the inside prices and market participant positions from the matching component, calculates the inside size and market center according to the existing rules and performs the ranking.

Execution reporting component 40 publishes execution related information to the downstream systems. Execution reporting component 40 receives executions from matching component 36 (for automatic executions), delivery component 44 (for accepted deliveries), and odd-lot rotation component 42 (for accepted odd-lots) and sends them downstream. Execution reporting component 40 also publishes delivery notifications (from matching component 36) and execution kill messages (from execution kill component 46).

Odd-lot rotation component 42 handles finding and assigning a contra party for the odd lots of mixed lot orders and pure odd lot orders. Execution reporting component 40 receives odd lots from matching component 36, submits them to the next market maker with sufficient odd lot exposure size and, on acceptance, passes them on for regular post-execution processing.

In other embodiments, matching component 36 may perform handling of odd lots occurrences by trading of actual shares. This approach aggregates actual shares of round, odd, and/or mixed lots of equally priced orders thereby reducing accounting ramifications. Further, by displaying a rounded down aggregate, rounded to the nearest round lot, a user familiar with round-lot-based systems may not be confused since the aggregate of actual shares is displayed in round lots.

Delivery component 44 is responsible for handling delivery of executions through trading services network 24. Delivery component 44 receives executions from matching component 36 and submits them to trading services network 24. Upon acceptance, and for the accepted size of a partial acceptance, the execution is passed to reporting component 40 for dissemination. Upon rejection and for the rejected size of a partial acceptance, the order is reintroduced into matching component 36.

Execution kill component 46 facilitates the kill of an execution between the two involved contra parties. Execution kill component 46 receives a request to kill an execution from one party. Once this component has received the confirmation to kill that very same execution from the contra party, Execution kill component 46 passes the execution kill to the reporting component 40 for dissemination and to trade reporting interface component 48 to inform trade reporting 24.

Each securities processor 12 includes a trade reporting interface component 48 and a continuous data stream (CDS) extract component 50. Trade reporting interface component 48 is responsible for transmitting executions and execution kills to trade reporting 24. Trade reporting interface receives executions via reporting component 40, converts them into a trade reporting format and passes them to trade reporting. Trade reporting interface also propagates execution kills received from execution kill component 46 to trade reporting to reflect this event. CDS Extract component 50 transforms securities processing architecture 10 quote information (excluding supervisory information) into a CDS feed for dissemination to other systems. CDS Extract component 50 primary output is a CDS Journal file 56.

Each securities processor includes an interval timer 58. Interval timer 58 provides a facility for timing events based on a requesters' requirements and to return the information to the requester upon the expiration of the time period supplied by the requester.

Each securities processor also includes support components, which are used by the other components for special processing (e.g., management of an order table) or serve as interfaces to related systems.

The order file builder component 52 is responsible for building the disk based order file that reflects the memory based order table of dynamic order data matching component 36 maintains in memory. This component uses the log file of order changes and applies them to the actual order file. The file is used the next trading day to load the order table for start of the trading day. Also, in the case that the matching component 36 ends abnormally, the memory tables can be reread from the built files.

The position file builder component 54 is the position generation's component equivalent of the order file builder. Position file builder component 54 maintains the market participant positions on the position quote file while the position generation component 38 works off its memory based position table.

Order Entry

Order entry component 32 of securities processing architecture 10 is the entry point for all transactions related to the entry and maintenance of orders and provides a centralized facility by which all orders entered are evaluated to determine whether these orders pass certain validation criteria. Order validations that are not dependent on the current market situation (e.g., valid security, refresh amount less than or equal to reserve size, etc.) are performed in order entry component 32. Validations that require inside market conditions (e.g., marketability check, short sale rule, etc.) and are subject to the serialization of events are performed in matching component 36. In part, order validations are based upon the categorization of the entering participant. Eligible participants include quoting market participants (QMPs), ECNs, unlisted trading privileges (UTPs), and order entry firms.

The validations performed in the order entry component 32 performs three types of checks: eligibility checks, syntax and reference validations, and interdependent conditions.

Eligibility checks include determining whether the order transaction is allowed for the market participant at that particular point in time. This is done by a series of flags and values, which include system level, security level and market participant level validations (e.g., does the system allow order entry at this time, is the firm allowed to enter orders, etc.). Syntax validations of fields ensure the syntactical adherence to permitted values and verify the correctness and existence of the values (e.g., valid security, valid market participant, etc.). Interdependent conditions validations are dependent upon the combination of field values (e.g., refresh amount without reserve amount). The interdependent conditions relate to activities that can occur during various time periods of the business day, but the information is primarily static during the day and does not change on every transaction.

An order that fails any of the validations is rejected and a response is sent to the entering market participant. Orders that pass the validations are prepared for matching component 36. As seen below, depending on the order transaction (i.e., order entry transaction, cancel transaction, cancel/replace transaction, order reinstate), different processing is performed.

Order entry transactions that pass the validations are assigned an order reference number, which is unique throughout securities processing architecture 10 and a branch sequence ID (unless provided by the user), which is unique with a market participant. The branch sequence ID and the order reference number are written to a matching trigger file in anticipation of being processed by matching component 36.

The matching trigger file is a first-in-first out (FIFO) queue that has order transactions from the quote entry component 34 and order entry component 32 as well as from the delivery (receiver) subcomponent 44a. In addition, supervisory transactions that affect the order table are passed to matching component 36 through the matching trigger file. However, since these supervisory transactions are complete and inclusive, the supervisory transactions are implemented as modular plug-in components.

For order cancel transactions, a market participant may cancel an order that the market participant has entered into the system. The order reference number of the order is used in performing this action. A cancel transaction cancels the entire current or remaining quantity of an order and effectively 'deletes' the order. After a cancel request has passed the validations, a trigger is written to the matching trigger file for matching component 36 to perform the actual cancel. This is necessary to adhere to the time priority requirement, i.e., an order that is currently being processed by matching component 36 cannot be cancelled while matching is in progress.

For order cancel/replace transactions, a market participant may cancel/replace an order that the market participant has entered into the system, i.e., the transaction is not available for an order that was generated from a quote or an order generated as a result of a system generated quote. The order cancel/replace transaction modifies the quantity values (i.e., display, reserve, refresh) of an order. There are two different ways to change the quantity of an order. First, the absolute value of the order quantity may be canceled and replaced with a new order quantity. Second, the order quantity may be changed relative to its current quantity, i.e., increased or decreased by a specified amount (e.g., +300 or 800). An order cancel/replace transaction with an absolute quantity change is processed similar to the entry of a new order, a relative quantity change similar to a quote update (see next main section).

For the reinstate order transaction, a market participant may reinstate an order that has been purged by the system or a supervisor. The order reference number of the order is used in performing this action. A reinstate transaction re-opens the entire current or remaining quantity of an order and effectively is like re-entering the order. After a reinstate request has passed validations, a trigger is written to the matching trigger file for matching component 36 to perform the actual reinstate. This is necessary to adhere to the time priority requirement since the order will be given a new order reference number and time priority for execution.

A programming structure that performs an order entry process 60 is exemplified by the following:

DetokenizeMessage( )
    ValidateEligibility( )
    ValidateCommonAttributes( )
    Case TransactionType
        OrderEntry
            ValidateOrderEntryAttributes( )
            ValidateMarketCondition( )
            GenerateOrderReferenceNumber( )
            If BranchSequenceNumber="
                GenerateBranchSequenceNumber( )
        OrderCancel
            ValidateOrderCancelReinstateAttributes( )
        OrderCancelReplace
            ValidateOrderCancelReplaceAttributes( )
            GenerateOrderReferenceNumber( )
    WriteMatchingTrigger( )

The functions in the programming structure are described below

Process 60 receives an order transaction from the messaging interface 14. An input message is converted from its source format to an Internal Standard Message Protocol (ISMP) format, which is a tokenized message format. Process 60 detokenizes (62) or disassembles the ISMP message and parses the message into the individual attributes and stores these attributes in a structured order file record layout that is used for subsequent validation and check processing. A transaction code within the message indicates whether the message is an order entry transaction, an cancel transaction, or an cancel/replace transaction. A DetokenizeMessage( ) function detokenizes the ISMP message.

Process 60 validates (64) the eligibility of the message. Eligibility checks include determining whether the transaction is allowed for the market participant at that moment in time through the uses done of a series of flags and values which include system level, security level and market participant level validations (e.g., does the system allow order entry at this time, is the firm allowed to enter orders, etc.). Process 60 checks whether the given transaction is allowed at this point in time from a system perspective and a user perspective by using a ValidateEligibility( ) function shown in the programming structure above. If any validation errors are encountered, a reject response message is generated, and the remaining validations are skipped.

Process 60 validates (66) common attributes by checking the attributes that are included in all three types of order entry transactions. These fields along with the validations performed are listed in table 1. Process 60 uses a ValidateCommonAttributes( ) function to validate the common attributes as shown earlier in the program structure.

TABLE 1

Common Validations for Order Entry Component

| Field | Validation Action | Validation Source |
|---|---|---|
| Market Participant ID | Market participant id must exist | Firm Profile File |
| Security ID | Security must exist<br>Security must be UTP enabled if market participant is UTP | Security File |

Process 60 determines (68) if the order transaction is an order entry transaction, an order/cancel transaction or an order cancel/replace transaction based on the transaction code.

If the transaction is an order entry transaction, process 60 validates (70) the order entry attributes. Table 2 lists attributes that are validated by the process 60. The validations are performed against values in reference data files that are both internal to securities processing architecture 10 (i.e., Give-up firms, quoting increments, securities, etc.) and external to securities processing architecture 10 (e.g., alternate clearing numbers in trade reporting 24). In addition, process 60 will handle omission validations, rejecting transactions where mandatory attribute values that have been omitted, as well as, providing default values for optional attribute values, which also have been omitted. If any validation errors are encountered, a reject response message is generated and the remaining validations are skipped. Process 60 validates (70) the order entry attributes by using a ValidateOrderEntryAttributes( ) function as shown in the program structure above.

TABLE 2

Order Entry Specific Validations

| Field | Validation Action | Validation Source |
|---|---|---|
| Alternate Clearing Number | Alternate clearing number must be valid in trade reporting | Trade Reporting Risk Mgmt. File |
| Attributable | UTP must not enter attributable orders Required if order is not IOC | Firm Profile |
| Capacity | Market participant class must be eligible for the capacity ('A', 'P', 'R') | Firm Profile, MP Class |
| Destination Market Participant ID | Destination market participant id must exist and not equal 'SIZE' Order must be limit order | Firm Profile |
| Give-Up ID | Give-up relation must exist on firm profile and not equal 'SIZE' | Firm Profile |
| Price | Price must be in quoting increment of security | Security File |
| Size | Size must be less than maximum order size Size * price must be less than threshold Size must be round lot if destination market participant id is not empty | System Control File |
| Refresh Size | Refresh size must equal or exceed minimum refresh size Refresh size must be round lot or round lot multiple | Security File |
| Reserve Size | Reserve size must be round lot or round lot multiple Order must be limit order Market participant must be eligible for reserve processing | Security File, MP Class |
| Short Sale | Market participant must be eligible for short sale exempt | Firm Profile |

Process 60 validates (72) market conditions. These validations are necessary due to specific conditions during system states such as before hours, system open, emergency market condition (EMC halt) and extended hours. A table 3 lists the conditional validations.

TABLE 3

Market Condition Specific Validations

| Condition/Situation | Validation |
|---|---|
| Before Hours Session | Directed orders are not allowed prior to the 'before hours' session. |
| Session open until System Close | Orders must indicate whether they will be eligible for the extended hours session. |
| EMC Halt | 'Directed' orders entered during a quote or EMC Halt will be rejected. |
| Canceling | Cancels are only applicable to orders based on orders, not quotes. |
| Directed Odd lot Orders | Directed odd lot orders are not allowed. |
| Extended Hours | If order is open at the end of Extended hours, the order shall be timed out. |

Process 60 generates (74) a reference number by returning a 12-byte reference number that is across components and day in the range of 0 to 265 (approximately 11.8 million). This number is generated by concatenating the three character process id of the process producing the number, a two character Base26 representation of the three least significant digits of the year, a two character base26 representation of the Julian day and a five character base26 sequence number. Each process will read the order activity log file using its process id and the encoded date as described above to find the sequence number used in the most recent add transaction. If no order is found, the process will start numbering at sequence number 00000. If an order is found, the process will add 1 to the sequence number and use it as the starting sequence number. This unique number may be used by the firms in future processing to verify the status of an order, for example, to cancel an order, or to cancel/replace an order. Process 60 generates (74) a reference number using a GenerateOrderReferenceNumber( ) function as shown in the program structure above.

Process 60 determines (76) if a branch sequence number is empty. The order must be assigned a branch sequence number if does not contain the market participant id of the user who entered the order. If the branch sequence number does not exist, process 60 generates (78) the sequence number using a by returning an 8-byte sequence number that is unique for each market participant for a day. This is accomplished by using the three character process id of the process producing the number followed by the 5 character Base26 sequence number of the order reference number. For orders coming in through a computer-to-computer interface (CTCI), the branch sequence number is a mandatory field and the transaction is rejected. Process 60 generates (78) by using a GenerateBranchSequenceNumber( ) function.

If the transaction is an order cancel/reinstate transaction, process 60 validates (82) the order cancel/reinstate attributes, by performing validations specific to the cancel request. If any of the validations fail, the request is immediately rejected and no further checks are made. The validations are field level checks only because order entry component 32 does not have access to the memory based Order Table of matching component 36 and thus cannot validate against the order to be canceled. After the validations have passed successfully, a cancel trigger is written to the matching trigger file. Matching component 36 then processes the trigger record and determines whether the order can be canceled or not. Process 60 validates (82) the order cancel/reinstate attributes by using a ValidateOrderCancelReinstateAttributes( ) function.

If the transaction is an order cancel/replace transaction, process 60 validates (84) the cancel/replace attributes by performing validations specific to the cancel/replace request. If any of the validations fail, the request is immediately rejected and no further checks are made. The validations are field level checks only because order entry component 32 does not have access to the memory base in the order table in matching component 36 and thus, cannot validate against the order to be replaced. Process 60 uses a ValidateCancelReplaceAttributes( ) function validate the cancle/replace attributes.

If all validations pass, process 60 calls (72) the GenerateOrderReferenceNumber( ) function to generate a new order reference number for the new order, and a CreateNewOrder( ) function is called to format the order and save it in the order file. A record is written to the matching trigger file, providing the relative record number of the order to be canceled, the relative record number of the replacing order, and an indication that the user wishes to cancel/replace the order (i.e., transaction type is 'R' for cancel/replace). Matching component 36 changes the status of the original summary order to cancel and activating the replacement or increment order.

Process 60 writes (80) the transaction to the matching trigger file for processing by the Matching component. Depending on the incoming transaction type (i.e., order entry, order cancel, order cancel/replace) different structures are used as described in the file definition of the matching trigger file. Process 60 uses a WriteMatchingTrigger( ) function to write the transaction to the matching trigger file.

The following table lists files accessed by order entry component 32. The type of file access is listed and for key sequenced files the key used is indicated ('P' for primary, 'A1' for first alternate, 'A2' for second alternate, 'M' for reading relevant information into memory on startup).

TABLE 4

File Table for Order Entry Component

| Filename | Filetype | Create | Read | Update | Delete |
|---|---|---|---|---|---|
| System Control | Relative Record | | ✓ (M) | | |
| Security Class | Key Sequenced | | ✓ (M) | | |
| Market Participant Class | Key Sequenced | | ✓ (M) | | |
| Security | Key Sequenced | | ✓ (M) | | |
| Firm Profile | Key Sequenced | | ✓ (M) | | |
| Market Participant | Key Sequenced | | ✓ | | |
| User File | Key Sequenced | | ✓ | | |
| Matching Trigger | Entry Sequenced | ✓ | | | |
| Trade Reporting Risk Management | Key Sequenced | | ✓ | | |
| Order Activity Log | Entry Sequenced | | ✓ | | |

All frequently used information is loaded into memory from the reference data files on startup of the component. Order entry component 32 is notified of intraday changes through the regular messaging to keep the information current. If, contrary to expectations, order entry component 32 shows signs of significant load, the order entry components can run in parallel as long as serialization within a security and user is ensured.

Quote Entry

Quote entry component 34 is the entry point for all transactions related to the entry and update of quotes and provides a centralized facility by which all quotes entered will be evaluated to determine whether they pass certain validation criteria. Quote validations that are not dependent on the current market situation (e.g., valid security, registered position or dynamic registration, etc.) are performed in quote entry component 34. Validations that require the use of inside market conditions (e.g., marketability check) and are subject to the serialization of events are performed in matching component 36. In part, quote validations will be based upon the categorization of the entering participant. Eligible participants include QMPs, ECNs, and UTPs.

All quote inputs are routed to quote entry component 34 via the messaging infrastructure. The inputs include quote updates from the terminals, application program interface (API) facsimiles and UTP participants. The purpose of the input is to update an individual market participant's quote position in a specific security. The update transactions include an open/close update, which changes the position status to "open" or "close." The update transactions also include withdraw/restore update, that updates the position state, withdraw or restore the participant's quote. In addition, update transactions include a Quote Update, which updates one or more components of the market participant's existing quote.

The incoming message is detokenized (disassembled) and validated to ensure it conforms to certain criteria pertaining to quote entry related rules, status of the entering participants and the current market conditions. A quote that fails any of the validations is rejected, and a response is sent to the entering market participant. Quotes that pass the validations are prepared for matching component 36. Depending on the transaction (i.e., entry, open/close, withdraw/restore), different processing is performed.

An exemplary program structure for quote entry includes the following actions, which shows the main program structure for normal processing within quote entry component 34 and is performed every time an input message is received. To avoid complexity, the program structure does not include branches for error or exception handling.

```
DetokenizeMessage( )
ValidateEligibility( )
ValidateCommonAttributes( )
Case TransactionType
    QuoteUpdate
        ValidateQuoteUpdateAttributes( )
        If NoPosition
            DynamicRegistration( )
            CreatePosition( )
        Else
            UpdatePosition( )
    OpenClose
        ValidateOpenCloseAttributes( )
        UpdatePosition( )
    WithdrawRestore
        ValidateWithdrawRestoreAttributes( )
        UpdatePosition( )
WriteMatchingTrigger( )
```

Figure 3:
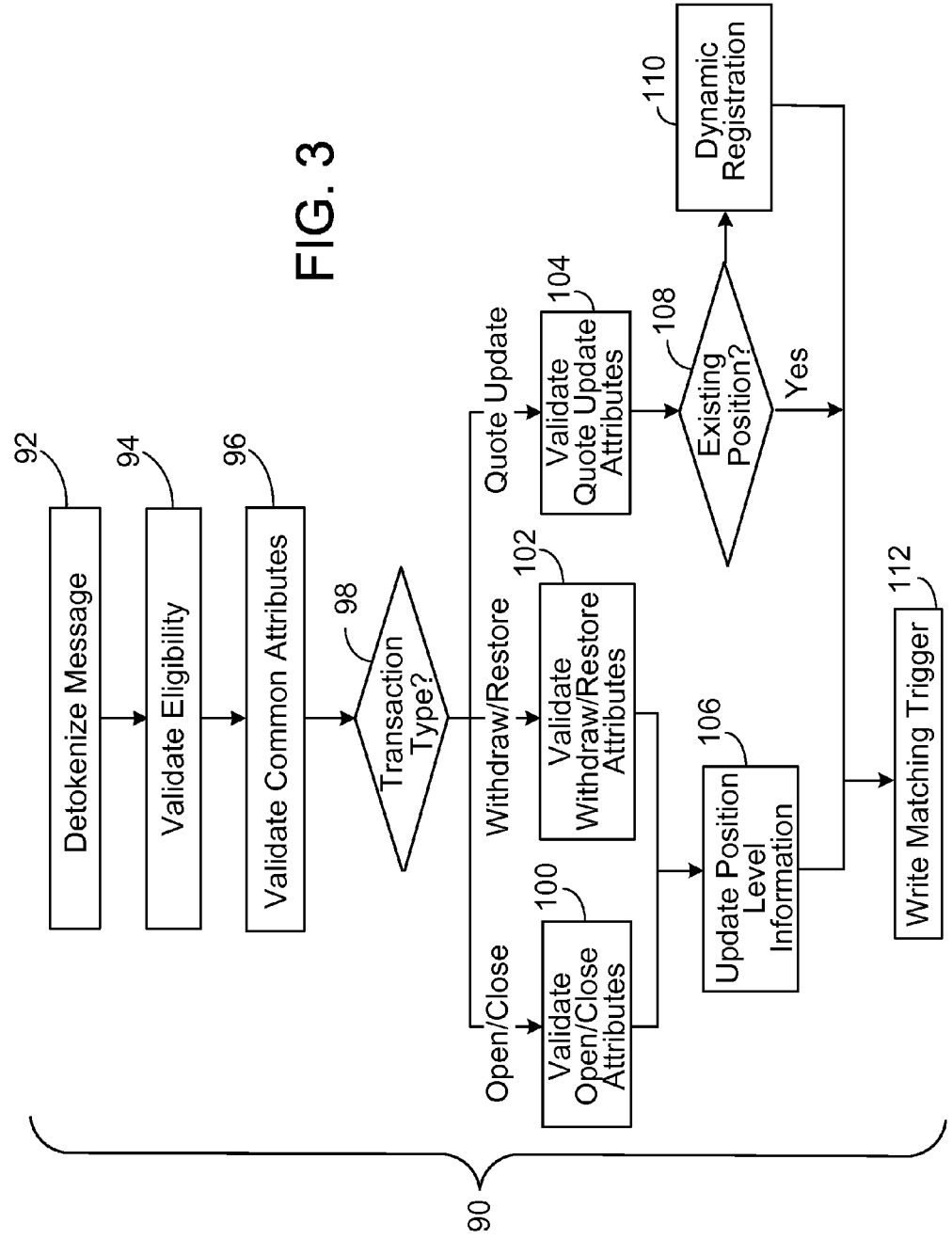
FIG. 3 is a flowchart of a process for quote entry.

Referring now to FIG. 3 an exemplary process 90 for quote entry component functions is shown. Quote updates, open/close transactions, and withdraw/restore transactions are received in the tokenized (ISMP) format. Process 90 detokenizes (disassembles) (92) the ISMP message before processing can commence. Process 90 parses the message into the individual attributes and stores them in the structured order file record layout that is used for the subsequent validation processing. A transaction code present in the message indicates whether the message is a quote update, open/close or withdraw/restore transaction.

Process 90 validates (94) the quote eligibility by checking whether the given transaction (i.e., quote update, open/close, withdraw/restore) is allowed at this point in time from a system perspective and a user perspective. This is done by a series of flags and values, which include system level, security level and market participant level validations. If any validation errors are encountered, a reject response message is generated and the remaining validations are skipped. Process 90 validates (94) the quote eligibility by using a ValidateEligibility( ) function as shown in the program structure above for quote.

Process 90 validates (96) the common attributes by checking the attributes that are included in all three transactions. These fields along with the validation performed are listed in table 5. Process 90 uses a ValidateCommonAttributes( ) function to validate (96) the common attributes as shown in the quote entry programming structure above.

TABLE 5

Common Validations

| Field | Validation Action | Validation Source |
|---|---|---|
| Market Participant ID | Market participant id must exist | Firm Profile File |
| Security ID | Security must exist Security must be UTP enabled if market participant is UTP | Security File |

Process 90 determines (98) which transaction type the quote transaction is. If the quote transaction is an open/close quote, process 90 validates (100) the open close attributes by checking whether the market participant's position can be opened or closed respectively. A valid open quote transaction is when the market participant's position is currently closed or in a prevent open, office outage or partial outage situation. A valid closed quote transaction is when the market participant's position is currently open, and the time is after the market participant's closing time or trading in general is closed. Process 90 determines (98) which transaction type the quote transaction is by using a ValidateOpenCloseAttributes( ) function.

If the quote transaction is a withdraw/restore quote transaction, process 90 validates (102) withdraw/restore attributes by checking whether the market participant can withdraw or restore the position. A valid withdraw quote transaction occurs when the market participant's position is currently not withdrawn or excused withdrawn. If the position is not open, the market participant close time must be greater than the current time or if early close is in affect the early close time is less than or equal to the current time. A valid restore quote transaction occurs when the market participant's position is currently withdrawn. Process 90 validates (102) withdraw/restore attributes by using a ValidateWithdrawRestoreAttributes( ) function.

If the quote transaction is a quote update transaction, process 90 validates (104) the quote update transactions by checking the attributes that are specific to the quote update transaction. These fields along with the validation performed are listed in table 6. Process 90 validates (104) the quote update transactions by using a ValidateQuoteUpdateAttributes( ) function.

TABLE 6

Quote Update Specific Validations

| Field | Validation Action | Validation Source |
|---|---|---|
| Bid/Ask Price | Price must be in valid format Rounding occurs if necessary For two-sided quotes bid price must be less than ask price | Security File |
| Bid/Ask Size | Size must be in round lots Delta size requires non-zero price For empty size default will be used Size must be less than maximum Size of zero (only allowed depending on market participant) requires price of zero | Security File Firm Profile File |
| Bid/Ask Reserve Size | Market participant must be eligible Size must be in round lots; deltas allowed Size must be less than maximum | Security File Firm Profile File |
| Bid/Ask Refresh Size | Market participant must be eligible Size must be in round lots; deltas allowed Size must be less than maximum and less than bid/ask reserve size | Security File Firm Profile File |

After the quote update validations are successfully passed, process 90 determines (108) that the market participant has a position in that security. If not, process 90 attempts (110) a dynamic registration.

The dynamic registration allows the generation or activation of the position on the Position File as necessary to support a quote update from a market participant who does not currently have an existing or active quote position in that security. In a DynamicRegistration( ) function, the market participant ID that was received in the incoming message (then found in the Firm Profile File but not in the Position File) is determined as eligible or ineligible for dynamic registration or not.

If the market participant is not eligible for dynamic registration, the transaction is rejected. If this feature is supported for the market participant, a new position is generated on the position file using the information from the quote entry transaction and defaults from the market participants firm profile file.

Process 90 writes (112) a matching trigger using a WriteMatchingTrigger( ) function. The WriteMatchingTrigger( ) function writes the transaction to the matching trigger file for processing by matching component 36. Depending on the incoming transaction type (i.e., quote update, open/close, withdraw/restore), different structures are used as described in the file definition of the matching trigger file.

All frequently used information is loaded into memory from the reference data files on startup of the component. Quote entry component 34 is notified of intraday changes through the regular messaging to keep the information current. If contrary to expectations and quote entry component 34 shows signs of significant load, the quote entry component can be scaled quite easily through parallel processing so that multiple quote entry components can run in parallel as long as serialization within a security and user is ensured.

Quote Update

Within matching component 36, quote update transactions are validated and processed. Quote update transactions can be initial quotes to establish a position, complete quote updates or quote tick changes. All transactions are either one-sided or two-sided and come from a market participant. Additionally, penalty processing can result in a system-generated quote. All of the processing described below is performed for each side of a two-sided quote. If one of the sides is marketable then the other side is added to the Order Table first, and the process continues with the side that crosses or locks the market.

A number of validations occur when a market participant submits a quote update transaction. One is a two-sided quote validation. Some market participants are required to maintain two-sided quotes unless they are in a bid mode state (determined from the market participant's position file). In a regular state, every quote update results in a two-sided display quote, which also means that the initial quote to establish a position is two-sided. If the market participant is required to have a two-sided quote, a OMLMPSummary( ) function is called to see if the market participant has attributable orders on the opposite of the market than the incoming order entry or quote update. If there are no attributable orders on the opposite side of the market, the transaction is rejected.

The two-sided quote validation is also used to determine whether the quote update is essentially an initial quote to establish a position, a quote update with a price change or simply an update maintaining the size. This is done for both sides of a two-sided quote since a possible result may be to have a new quote on one side of the market and a quote update on the other side. Thus, each side has their own determination to indicate which event is taking place.

In a system-generated quote validation, it is determined if the market participant has sent a quote update in the meantime. Using the OMLMPSummary( ) function the timestamp of the market participant's current display quote can be retrieved. If it is between the times that the quote was brought down for penalty processing and the current time, and the position is active, no further processing occurs because the market participant has already established a new position.

In relative update validations, if the quote update includes relative price or size changes, it is necessary to validate that the resulting price or size, including reserve and refresh size changes, are within the allowable boundaries (e.g., greater than zero, less than maximum size/threshold amount, etc.).

If any one of the above validations fails, the transaction is rejected and no further processing occurs. If it was determined during the above validations that the transaction is quote update with a price change then the old order is retrieved via an OMLGetOrder( ) function using the order reference number of the old quote (this can be obtained from the market participant summary information). Since the new quote replaces the old order it, along with all dependent orders, has to be set to canceled using an OMLModifyOrder( ) function.

Quote updates that maintain the size only are prepared just like order increments and decrements and are processed accordingly in an UpdateQuote( ) function. The UpdateQuote( ) function is responsible for reflecting the quote in the Order Table or prepare it for matching. If a quote does not lock or cross the inside, it is updated in the Order Table. Different processing is required for an initial quote and for a quote update that replaces an existing quote. Initial quotes are added to the Order Table by calling an AddOrder( ) function, while 'true' updates via an UpdateOrder( ) function and replacing the existing quote in the Order Table.

If it is a two-sided quote, the side that does not lock or cross the market is updated or added. The side that locks or crosses the inside is dealt with subsequently in the Matching( ) function, and any remainder will be added to the Order Table after that. If the transaction is a 'true' quote update, the existing quote on the side that is marketable must be removed from the Order Table because it will be replaced by any remainder after matching.

If the quote update is a relative update, i.e., a size increment or size decrement, then the processing is handled just as it is for relative size changes on order via the IncrementOrder( ) or DecrementOrder( ) functions.

The purpose of the IncrementOrder( ) function is to process a delta increase for either a quote update or an order. An increment adds to the total size of an order, the reserve size, and/or the refresh size. However, as the original order must keep its time priority, the increased size must receive the current timestamp. The increment is stored as a dependent order linked to the original. Thus, the dependent orders are correctly handled during matching when time priority has to be accounted for, but they are also connected so that subsequent updates affect all components of an order.

There can also be changes to reserve size and refresh size. These are stored on the original order because it is one order from the market participant's perspective. So, the original order is updated directly using the UpdateOrder( ) function to reflect modifications to reserve and refresh size.

The purpose of the DecrementOrder( ) function is to process a delta reduction for either a quote update or an order. A decrement reduces the total size of an order, the reserve size, and/or the refresh size. However, as this order may have multiple linked orders, the latest (i.e., most recently entered) linked orders will first be decremented, and then the decrement continues traversing the linked orders until the delta reduction request is fully satisfied. There can also be changes to reserve size and refresh size.

The reserve size and the refresh size of an order that has linked, dependent orders is stored with the original order (because it is one order from the market participant's perspective). Thus, if the reserve or refresh size is modified, the original order is updated directly using the UpdateOrder( ) function.

The decrement can affect updates to more than one order; if the decrement size is greater than the size of the most recent dependent order. The DecrementOrder( ) function traverses the list of dependent orders and decrements from the most recently entered down to the original order. Dependent orders that, after the decrement have a quantity of zero, are effectively canceled and consequently removed from the list. The UpdateOrder( ) function also maintains the total quantities on the original order.

Delivery

Figure 4:
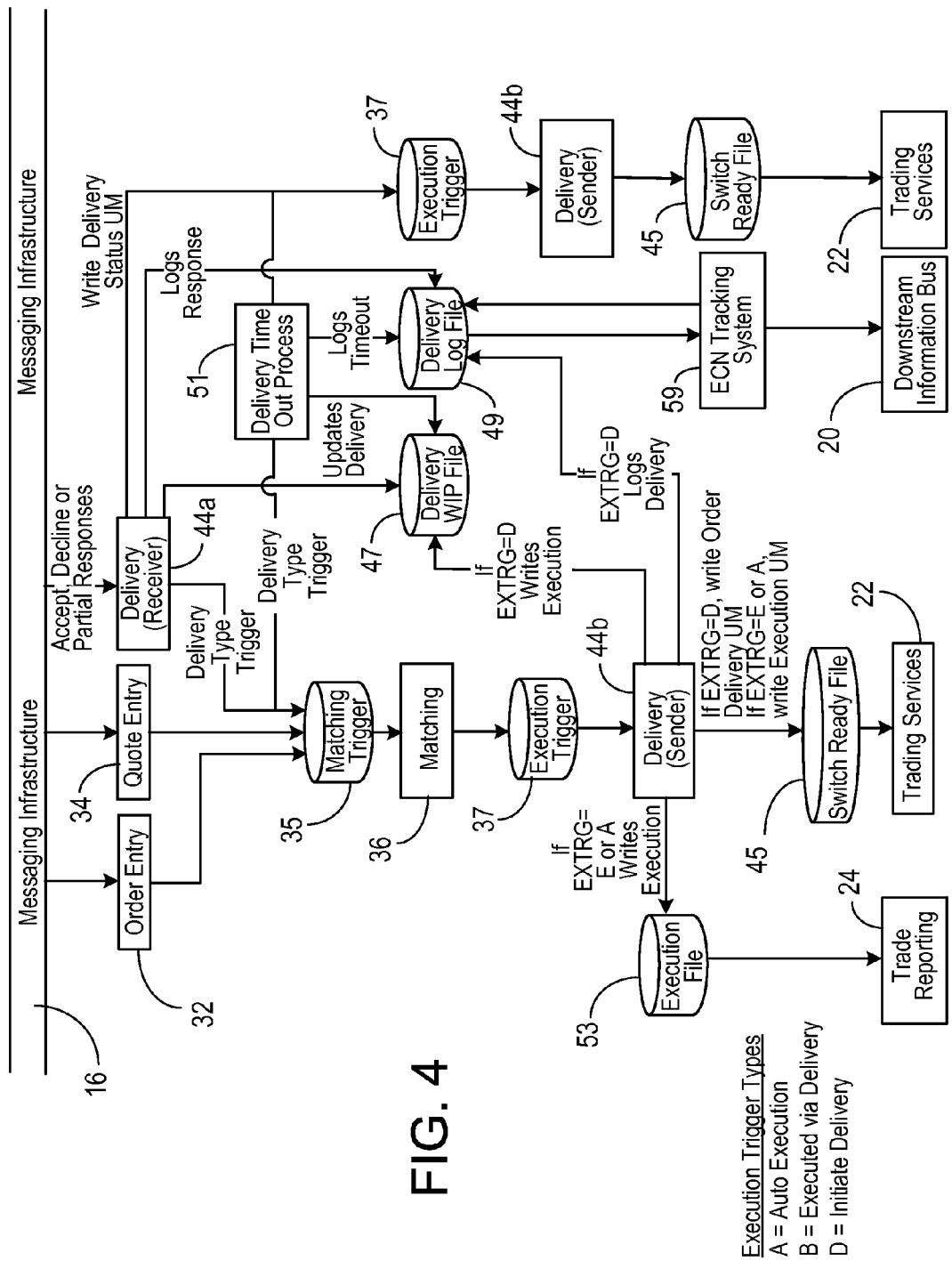
FIG. 4 is a functional diagram of a delivery system.

Referring to FIG. 4, after matching component 36 has matched an order, the matching component 36 passes onto delivery (sender) subcomponent 44b information as to whether the order will be a delivered order or an automatically executed order based on a trigger type by writing the information to an execution trigger 37. Execution trigger 37 is a FIFO queue. When auto execution occurs the order is automatically executed without notifying the parties prior to the transaction. The parties include a party with the outstanding order on the books and a party with the incoming order. However, when the order is a delivery order, delivery (sender) subcomponent 44b notifies the party with the outstanding order of the match by sending an unsolicited message (UM) to that party that an incoming order matches an outstanding order. The party with the outstanding order may accept the delivery, decline the delivery, or partially accept the order.

The following is a more detailed description of the delivery process. The process, as described below, illustrates an order but the process is also applicable to quotes. Order entry component 32 writes to matching trigger 35. Matching component 36 receives matching trigger 35 and determines if the order is marketable. If it is marketable, marketing component 36 writes to execution trigger 37 that the order is a delivery order.

Delivery (sender) subcomponent 44b receives execution trigger 37, scans the execution trigger 37 for orders marked for delivery, and writes a delivery record to a delivery work-in-process (WIP) file. The delivery record includes a copy of an execution trigger record, a delivery status, a delivery quantity (for tracking partial accepts), and calculates delivery expiration time. Delivery (sender) 44b sends the unsolicited message to a market participant designated as the delivery recipient for final acceptance. To send the unsolicited message, delivery (sender) 44b writes a switch ready file 45 containing the unsolicited message and passes it to trading services 22. Delivery (sender) 44b also writes the execution to an execution file 53, which is sent to trade reporting 24.

Delivery (sender) 44b also initiates a delivery timer (not shown). The delivery timer continuously monitors delivery WIP file 47. The delivery timer also initiates a delivery timeout process 51 if the delivery has expired because a response was not received by the delivery recipient. In this embodiment, the delivery order times-out if the delivery recipient does not respond in 30 seconds. Time-out process 51 includes updates to the delivery record in delivery WIP file 47 including updating the delivery status to time-out, updating the delivery quantity to zero and updating a time-out timestamp. The time-out processing also includes sending a time-out unsolicited message to the delivery recipient via delivery log file 49, and writing to the matching trigger 35 to pass the time-out delivery to matching component 36 for further processing.

Delivery (sender) 44 records the delivery in a delivery log file 49. Delivery log file 49 sends the information to downstream bus 20 for dissemination to an ECN processing monitor (not shown) described below.

The market participant may accept, decline or partially accept the delivery. When the market participant makes a response it is received by delivery (receiver) 44*a*. Delivery (receiver) 44*a* validates the price and quantity and checks the record in delivery WIP file 47 for the time-out status. Delivery (receiver) 44*a* also updates the record in WIP file 47 for delivery quantity and delivery status and marks a response timestamp. Delivery (receiver) sends the response to delivery log 49. Delivery (receiver) 44*b* writes matching trigger 35 to pass the results of the delivery to matching component 36.

Figure 5:
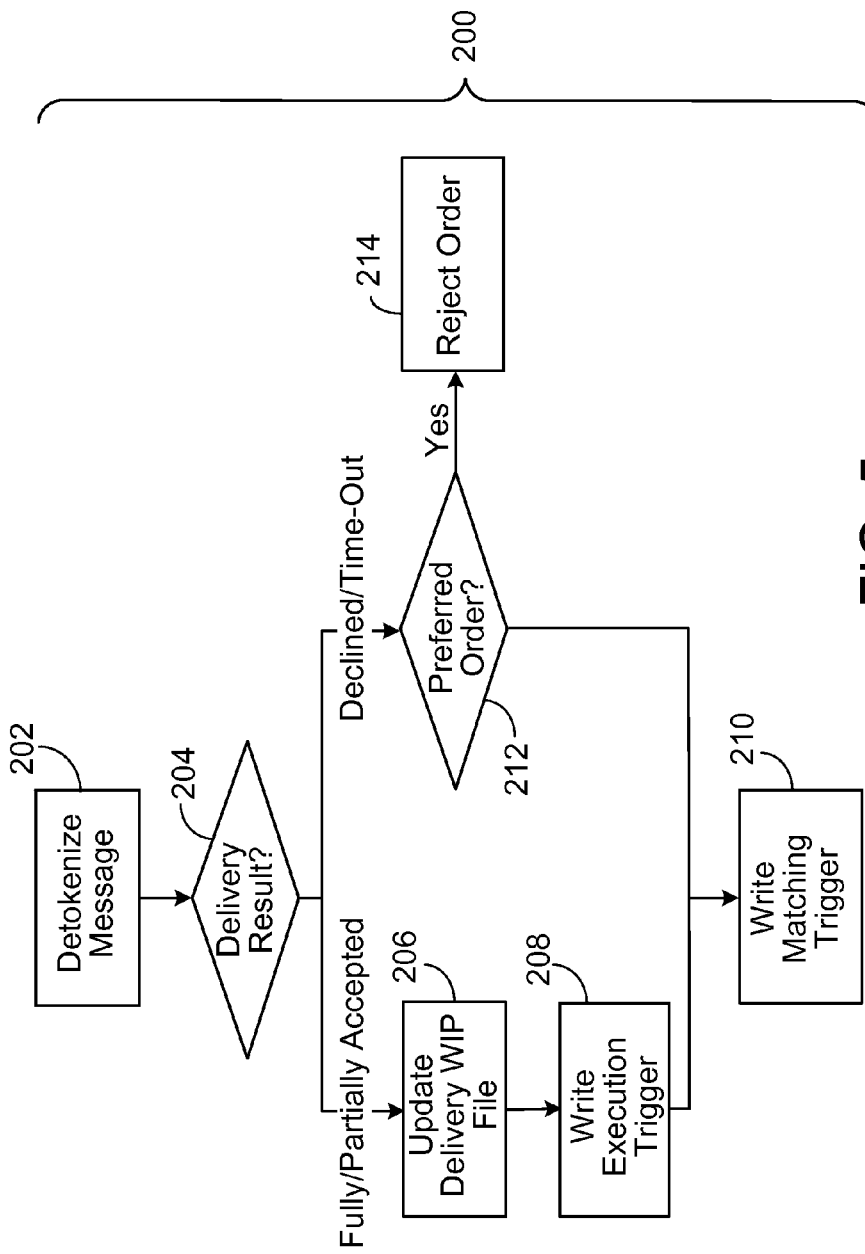
FIG. 5 is a flowchart of a process used by a delivery (receiver) component.
Figure 6:
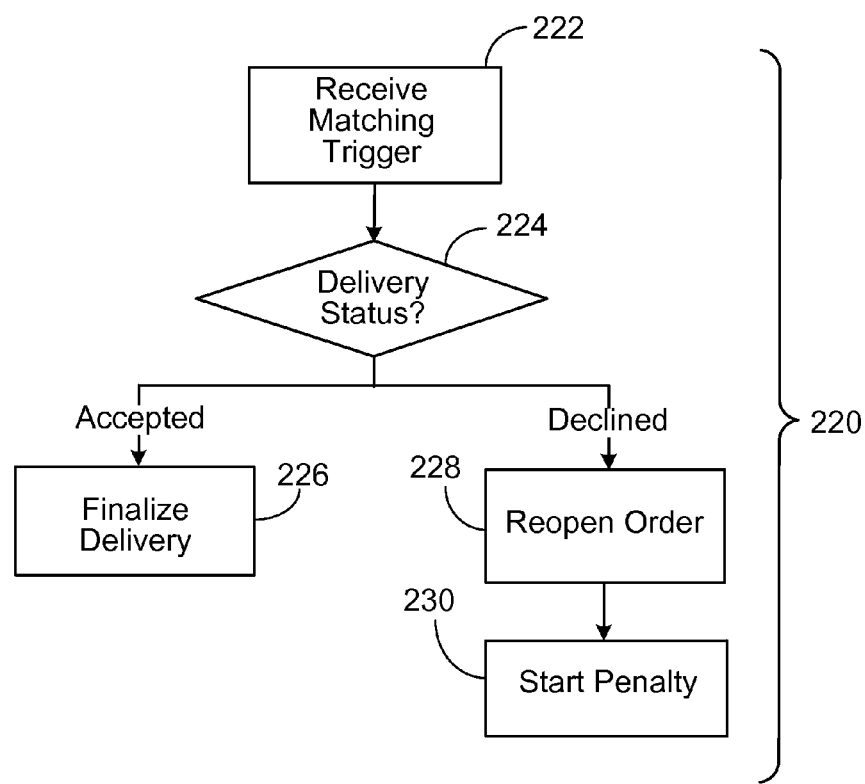
FIG. 6 is a flowchart of processing a message within a matching component.
Figure 7:
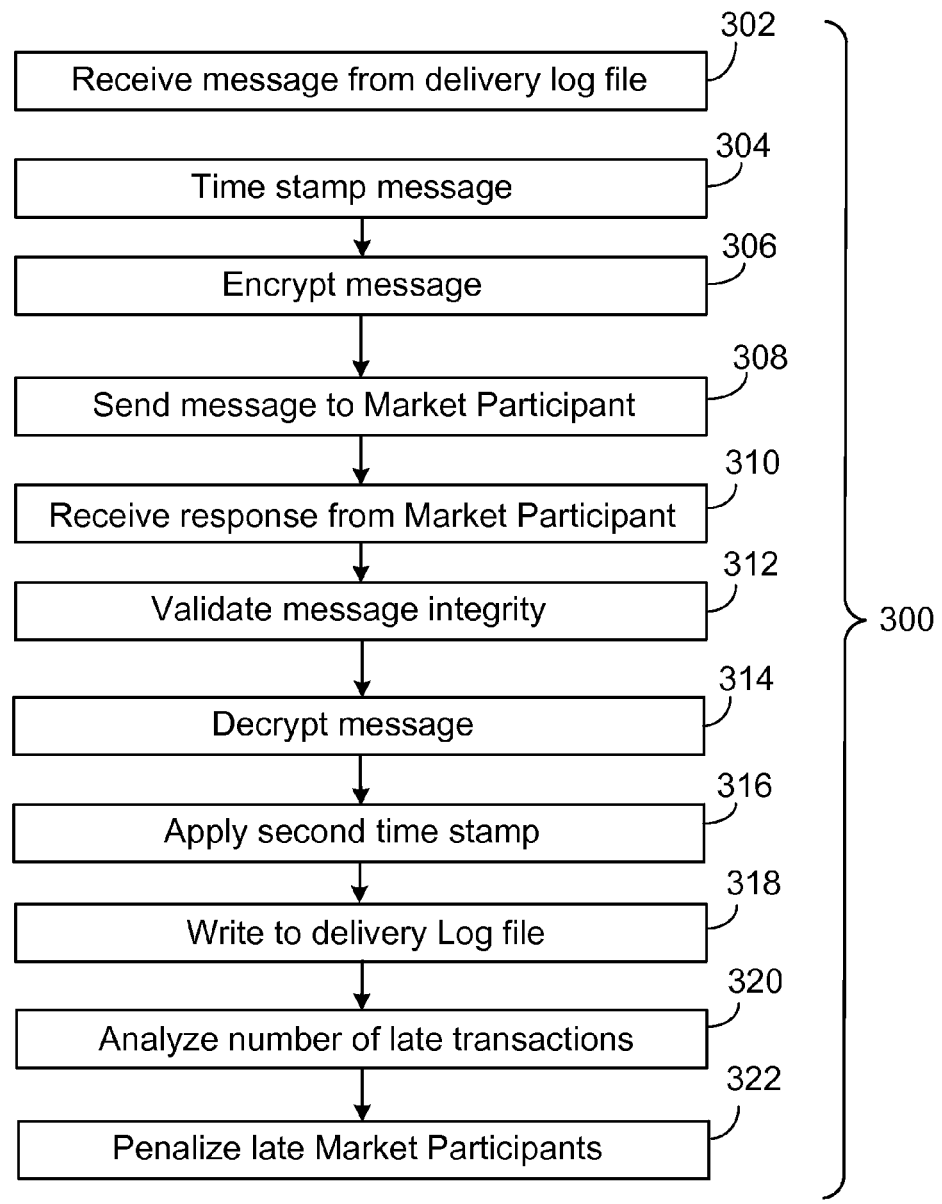
FIG. 7 is a flowchart of a process for monitoring a market participant's response time to delivery messages.

Referring to FIG. 5, delivery (receiver) 44 follows a process 200 when handling the response message from the market participant. Process 200 detokenizes (202) or disassembles the response message. Process 200 determines (204) if the response is fully accepted, partially accepted, declined or timed-out.

If the response message calls for partially accepted or fully accepted delivery order, process 200 updates (206) delivery WIP file 47. Process 200 writes (208) to execution trigger 37. Process 200 writes (210) to matching trigger 35.

If the response message calls for declining the order or the order has time-out, process 200 determines (212) if the delivery is a preference order. If the delivery order is not a preference order, process 200 (214) rejects the delivery order. Otherwise, process 200 writes (210) to matching trigger 35.

Matching component 36 follows a process 220 in processing matching trigger in response messages. Process 220 receives (222) matching trigger 35 that has the delivery outcomes (e.g., accept, decline) and examines both orders for pending cancellations and pending decrements and resolves them. Process 220 also updates the order file. Process 220 determines (224) if an order is accepted or declined. For accepted deliveries process 220 finalizes (226) delivery by writing a final execution trigger. For declined deliveries, process 228 re-opens (228), for the order entry side, the order for a possible match against other orders on the book. For the delivery recipient side, process 220 cancels all market participant's orders at the price level of the declined order and initiates penalty processing if no more attributable orders are available on the delivery recipient side. Process 220 penalizes (230) the delivery recipient.

Market Participant Response Monitoring Process

A market participant response monitoring system 59 monitors whether a market participant, such as an ECN, has responded to the unsolicited message (requesting confirmation to execute an order) within a specified amount of time, e.g., five seconds by using a process 300. Process 300 receives (302) the message from the delivery log file 49. Process 300 places (304) a first timestamp on the message. Process 300 encrypts (306) the message and sends (308) the message to the market participant. Process 300 receives (310) the response from the market participant. Process 312 validates (312) that the message has not been tampered with by the market participant. Process 300 decrypts (314) the message. Process 300 applies (316) a second time stamp to the message. Process 300 writes (318) into delivery log file 49 both time stamps for that order. Process 300 analyzes (320) the number of transactions that exceed the predetermined amount by subtracting the first time stamp from the second time stamp. If the number exceeds a certain value over a specified period of time, process 300 penalizes (322) the market participant. For example, the market participant can be removed from trading in system 10. The removal of a market participant can occur manually or automatically.

Hardware and Software Embodiments

The processes (process 60, process 90, process 200, process 220 and process 300) described above are not limited to use with the hardware and software of FIGS. 1 and 4; the processes may find applicability in any computing or processing environment and with any type of machine that is capable of running a computer program. The processes may be implemented in hardware, software, or a combination of the two. For example, the processes may be implemented in a circuit that includes one or a combination of a processor, a memory, programmable logic and logic gates. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform the processes. The processes may also be implemented as a machine-readable storage medium, configured with a computer program, where upon execution, instructions in the computer program cause the computer to operate in accordance with the processes.

Each process is not limited to the specific embodiments described herein. The processes are not limited to the specific processing order of FIGS. 2, 3, 5, 6 and 7. Rather, the blocks of FIGS. 2, 3, 5, 6 and 7 may be re-ordered, as necessary, to achieve the results set forth above.

Other embodiments are also within the scope of the following claims.

What is claimed is:

1. A method executed over a network of computer systems for processing delivery messages that indicate existence of a match in trading interest in an electronic trading venue, the method comprising:

receiving by one or more computers, an expression of interest to enter into a transaction to buy or sell a security, wherein the expression of interest is an order;

matching the expression of interest with other expressions of interest;

sending by the one or more computers, over a network, to at least one other computer system, a message to a market participant that a match exists between the expression of interest with another of the other expressions of interest;

recording by the one or more computers, a delivery of the message in a delivery log file;

recording by the one or more computers, the delivery of the message in a delivery work in process (WIP) file;

receiving by the one or more computers, a response message from the market participant;

for response messages indicating an acceptance of a full or partial execution,
writing executions to an execution trigger and sending the execution trigger to a delivery sender component.

2. The method of claim 1 wherein the computer system is a multi-parallel system including a plurality of processors, each processor handling a fraction of the securities in a market.

3. The method of claim 1, further comprising:
performing a time-out when the response message arrives after a predetermined amount of time after the message is sent.

4. The method of claim 3, further comprising:
detokenizing the response Message; and
determining whether a delivery result is a partially accepted order, a fully accepted order, a declined order or a timed-out order.

5. The method of claim 4, further comprising for fully accepted and partially accepted orders:
updating the delivery WIP file; and
writing a matching trigger in accordance with the received message.

6. The method of claim 5, further comprising:
determining if the order is preferred for a declined delivery or a timed-out delivery.

7. The method of claim 6, further comprising:
writing a matching trigger for preferred orders.

8. The method of claim 6, further comprising:
rejecting non-preferred orders.

9. The method of claim 6, further comprising:
receiving the matching trigger;
determining if the order is accepted or rejected.

10. The method of claim 8, further comprising:
executing accepted orders.

11. The method of claim 8, further comprising:
reopening declined orders; and
penalizing the market participant having a predetermined number of declined orders.

12. An article comprising a machine-readable medium that stores executable instructions for validation of delivery messages that indicate existence of a match in trading interest in an electronic trading venue, the instructions causing a machine to:
receive an expression of interest to enter into a transaction to buy or sell a security, wherein the expression of interest is an order;
match the expression of interest with other expressions of interest;
send a message to a market participant that a match exists between the expression of interest with another of the other expressions of interest;
record a delivery of the message in a delivery log file;
record the delivery of the message in a delivery work in process (WIP) file;
receive a response message from the market participant; and
for response messages indicating an acceptance of a full or partial execution:
write executions to an execution trigger and send the execution trigger to a delivery sender component.

13. The article of claim 12 wherein the electronic trading venue is a multi-parallel system including a plurality of processors, each processor handling a fraction of the securities in a market.

14. The article of claim 12, further comprising instructions causing a machine to:
perform a time-out when the response message arrives after a predetermined amount of time after the message is sent.

15. The article of claim 14, further comprising instructions causing a machine to:
detokenize the response message; and
determine whether a delivery result is a partially accepted order, a fully accepted order, a declined order or a timed-out order.

16. The article of claim 15, further comprising for fully accepted and partially accepted orders:
update the delivery WIP file; and
write a matching trigger in accordance with the received message.

17. The article of claim 16, further comprising instructions causing a machine to:
determine if the order is preferred for a declined delivery or a timed-out delivery.

18. The article of claim 17, further comprising instructions causing a machine to:
write a matching trigger for preferred orders.

19. The article of claim 18, further comprising instructions causing a machine to:
reject non-preferred orders.

20. The article of claim 14, further comprising instructions causing a machine to:
receive the matching trigger;
determine if the order is accepted or rejected.

21. The article of claim 19, further comprising instructions causing a machine to:
execute accepted orders.

22. The article of claim 19, further comprising instructions causing a machine to:
reopen declined orders; and
penalize the market participant having a predetermined number of declined orders.

23. A system comprising:
a memory that stores executable instructions for validations of delivery messages that indicate existence of a match in trading interest in an electronic trading venue;
the system executes instructions to:
receive an expression of interest to enter into a transaction to buy or sell a security, wherein the expression of interest is an order:
match the expression of interest with other expressions of interest;
send a message to a market participant that a match between the expression of interest with another of the other expressions of interest exists;
record a delivery of the message in a delivery log file;
record the delivery of the message in a delivery work in process (WIP) file;
receive a response message from the market participant; and
for response messages indicating an acceptance of a full or partial execution: write executions to an execution trigger and send the execution trigger to a delivery sender component.

24. The system of claim 23 wherein the system includes a plurality of security processors, each security processor handling a fraction of the securities in a market.

25. The system of claim 23, further comprising instructions to:
perform a time-out when the response message arrives after a predetermined amount of time after the message is sent.

26. The system of claim 25, further comprising instructions to:
  detokenize the response message; and
  determine whether a delivery result is a partially accepted order, a fully accepted order, a declined order or a timed-out order.

27. The system of claim 26, further comprising for fully accepted and partially accepted orders instructions to:
  update the delivery WIP file; and
  write a matching trigger in accordance with the received message.

28. The system of claim 27, further comprising instructions to:
  determine if the order is preferred for a declined delivery or a timed-out delivery.

29. The system of claim 28, further comprising instructions to:
  write a matching trigger for preferred orders.

30. The system of claim 29, further comprising instructions to:
  reject non-preferred orders.

31. The system of claim 25, further comprising instructions to:
  receive the matching trigger;
  determine if the order is accepted or rejected.

32. The system of claim 30, further comprising instructions to:
  execute accepted orders.

33. The system of claim 30, further comprising instructions to:
  reopen declined orders; and
  penalize the market participant having a predetermined number of declined orders.

* * * * *